Figure 1:
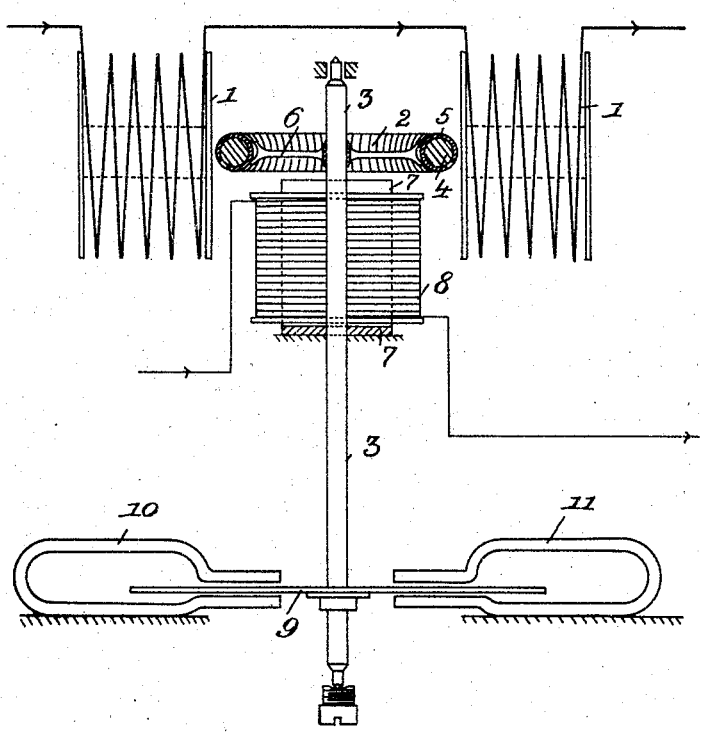

No. 790,258. PATENTED MAY 16, 1905.
A. MAY.
ALTERNATING CURRENT METER.
APPLICATION FILED JULY 29, 1903.

2 SHEETS—SHEET 1.

Witnesses
H. M. Kuehne
John A. Prewal

Inventor
Albin May
By Richardson
Attorneys

No. 790,258. PATENTED MAY 16, 1905.
A. MAY.
ALTERNATING CURRENT METER.
APPLICATION FILED JULY 29, 1903.
2 SHEETS—SHEET 2.
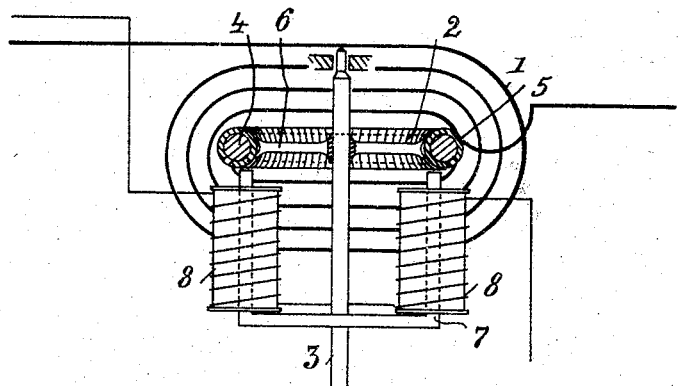
Fig. 2.
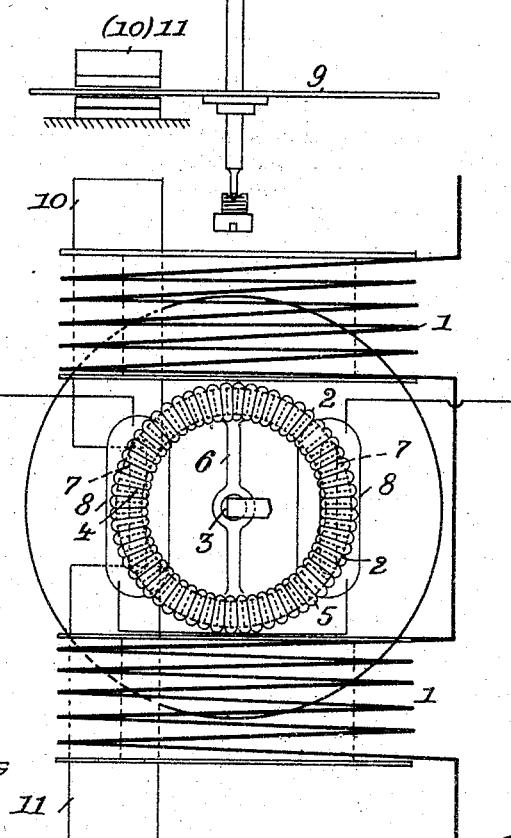
Fig. 3.

No. 790,258.                                                Patented May 16, 1905.

UNITED STATES PATENT OFFICE.

ALBIN MAY, OF BERLIN, GERMANY, ASSIGNOR TO INTERNATIONALE-ELEKTRIZITÄTS-ZÄHLER GESSELLSCHAFT M. B. H., OF BERLIN, GERMANY.

ALTERNATING-CURRENT METER.

SPECIFICATION forming part of Letters Patent No. 790,258, dated May 16, 1905.

Application filed July 29, 1903. Serial No. 167,483.

*To all whom it may concern:*

Be it known that I, ALBIN MAY, electrician, of 4 Wassergasse, Berlin, in the Empire of Germany, have invented certain new and useful Improvements in Alternating-Current Meters, of which the following is a full, clear, and exact specification.

The majority of the alternating-current meters introduced hitherto, which are based on the principle of the Ferraris rotatory field and the Thomson effect, consist in the combination of one or more main current and shunt fields, which act on a body free to rotate. The magnet-fields in this case either combine to form a resultant field or act separately, and the effect takes place either symmetrically or unsymmetrically to the axis of rotation. In the majority of alternating-current meters there are iron cores in the fixed main fields and shunt-current coils and a nonmagnetic rotary body in which currents are induced by the fixed alternate-current magnet-fields, which cause a speed proportional to the consumption, whereby the lines of force produced permeate a part of the rotary body perpendicularly. The present alternating-current meter differs essentially from such familiar systems in that an iron-free main-current field directed perpendicularly to the turning axis and a shunt-field directed perpendicularly to both the main and the turning axis move a rotary body or armature secured to the axis, which armature, consisting of iron, forms the magnetic junction of the shunt-field in such manner that the lines of force of the shunt-field are directed in several distinct separate paths peripherally through the rotary iron body. Furthermore, the rotary body does not stand perpendicularly to the lines of force of the main-current field, being only partially permeated by them, but completely inclosed by them.

The object of this new device consists in the attainment of a strong torque, with light weight of the moving system, (*i. e.*, of the paramagnetic rotary body,) in conjunction with small consumption in the shunt-circuit, which is magnetically closed by the rotary body itself, and a proportionately slight drop in tension in the field of the principal current, which having no iron core possesses less inductive effect.

According to one form of my invention the rotary body or armature is placed in the field of the main coils and is preferably made of an annular portion connected to the axle by struts and suitably laminated in order to prevent the formation of eddy-currents. The rotary body is provided with a short-circuited winding of suitable dimensions—such, for example, as an uninsulated copper wire half a millimeter in thickness in metallic contact with the iron body. The shunt-field stands perpendicularly to the main field and is provided with a horseshoe-shaped iron core. This shunt magnetic field is so arranged that its lines of force enter with as small an airgap as possible into the rotary body, which is so placed as to complete the magnetic circuit of the horseshoe-shaped core by means of lines of force directed in several distinct paths within the rotary iron body.

Careful experiments have shown that a good turning effort is produced when the rotating body consists of a ring constructed wholly of iron. The action is, however, much improved by surrounding the iron rotating body with a short-circuited good conducting mantle or sheathing, preferably without any insulation. For this purpose I sometimes use a metallic box (of copper, for example) completely inclosing the iron ring, or I may use a large number of sections of winding of bare metal wire, each one short-circuited in itself. A single circuited turn of wire for each section of winding may be sufficient. An effective and practical arrangement has been proved to be a coil of bare copper wire about half a millimeter thick, short-circuited in itself and having its coils completely or for the most part in metallic contact with one another and with the iron body. On the same axis as the rotating body I arrange in the ordinary manner a metal disk rotating between fixed permanent magnets to act as a brake. For facilitating starting special devices of well-known construction are employed.

In order that the meter may give correct indications with an inductive load, the field produced by the shunt-winding should be displaced approximately ninety degrees with regard to the pressure.

One form of my invention is illustrated in the accompanying drawings, in which—

Figure 1 is an elevation, and Fig. 2 is a lateral view of the elevation shown in Fig. 1. Fig. 3 is a plan view.

In the field of the stationary main coils 1 1 is a rotary body (armature) 2 4, mounted on a spindle 3. The rotary body is of annular form and consists of solid iron 4, supported by spokes 6 and provided with a short-circuited winding of suitable dimensions—for example, five layers of bare copper wire about one-half millimeter in diameter.

The shunt-field 7 8 stands at right angles to the main-current field, and in the form of apparatus shown in the drawings it possesses an iron core 7 of horseshoe shape. This shunt-field is so arranged that its lines of force enter the rotary body 2 4, located opposite the two poles, with the smallest possible air-gap, the said rotary body thus simultaneously closing the path of the lines of force.

On the vertical spindle 3 a rotary metallic disk is provided in the ordinary manner between two stationary magnets.

Having thus described my invention, what I claim as new, and desire to secure by Letters Patent, is—

1. An alternating-current meter, comprising main-current coils, a rotary annular iron body located between the same and completely inclosed by the lines of force of the main-current field, and a stationary shunt-field directed perpendicularly both to the main-current field and the axis of the said rotary body, its lines of force being conducted peripherally in several distinct paths by the said rotary body, substantially as described.

2. An alternating-current meter, comprising main-current coils, a rotary annular iron body, having a short-circuited winding of good conducting material, located between the said coils and completely inclosed by the lines of force of the main-current field, and a stationary shunt-field directed perpendicularly both to the main-current field and the axis of the said rotary body, its lines of force being conducted peripherally in several distinct paths by the said rotating body, substantially as described.

In witness whereof I have hereunto set my hand in presence of two witnesses.

ALBIN MAY.

Witnesses:
HENRY HASPER,
HANS HEIMANN.